United States Patent [19]

Taniguchi et al.

[11] Patent Number: 4,922,332
[45] Date of Patent: May 1, 1990

[54] METHOD OF AND APPARATUS FOR GENERATING TINT PATTERN DATA

[75] Inventors: Hisayuki Taniguchi; Masaaki Yamamura, both of Kyoto, Japan

[73] Assignee: Dainippon Screen Mfg. Co., Ltd., Japan

[21] Appl. No.: 297,072

[22] Filed: Jan. 13, 1989

[30] Foreign Application Priority Data

Jan. 14, 1988 [JP] Japan .................... 63-4698

[51] Int. Cl.$^5$ ...................... H04N 1/395; H04N 1/415
[52] U.S. Cl. ......................... 358/77; 358/75; 358/451; 382/55
[58] Field of Search .................. 358/75, 77, 287, 451; 382/55

[56] References Cited

U.S. PATENT DOCUMENTS

| | | | |
|---|---|---|---|
| 4,204,232 | 5/1980 | Mizuno | 382/55 |
| 4,290,084 | 9/1981 | Minshull et al. | 358/287 |
| 4,503,469 | 3/1985 | Kato | 358/287 |
| 4,644,392 | 2/1987 | Yamada | 358/75 |
| 4,665,441 | 5/1987 | Sakaue et al. | 382/55 |
| 4,748,443 | 5/1988 | Uehara et al. | 382/55 |

OTHER PUBLICATIONS

H. Tamura, Soken Shuppan Co., "An Introduction to Computer Image Processing", Mar. 10, 1985, pp. 72-73 and 80-82.
H. Tamura, Electro Technical Laboratory, "Multidisciplinary Image Processing and Its Software Support System", Report No. 835, Sep. 1983, pp. 32-41.

Primary Examiner—Howard W. Britton
Assistant Examiner—Kim Yen Vu
Attorney, Agent, or Firm—Ostrolenk, Faber, Gerb & Soffen

[57] ABSTRACT

An original image including a line area and image areas separated from each other across the line area is subjected to a thinning process, whereby an iamge (10a) including a thinned line area (1a) and enlarged image areas (2a, 3a, 4a) is obtained. The enlarged image areas are sequentially expanded by a width of the thinned line area to form respective tint areas, and tint pattern data expressing respective shapes of the tint areas with prescribed colors are obtained.

22 Claims, 9 Drawing Sheets

METHOD OF AND APPARATUS FOR GENERATING TINT PATTERN DATA

BACKGROUND OF THE INVENTION

1. Field of the Invention

The present invention relates to a method of and an apparatus for generating tint pattern data used for producing tint patterns by means of which a color print is reproduced.

2. Description of the Prior Art

In a color printing process, there are some cases where tint patterns producing respective uniform colors are printed on the same printing paper to produce a color print on which respective tint patterns are printed in contact with each other but without a blank line between them.

The following steps are generally carried out in order to produce such tint patterns. First, a line drawing is manually prepared by a designer, which line drawing defines outlines of different pattern areas to which respective uniform colors are assigned. A block copy of the line drawing is made and a positive picture of the block copy is taken as an original to be set for a process scanner. The process scanner reads the original picture to produce image data expressing the line drawing. An operator determines the respective uniform colors for the different pattern areas in the drawing by inputting color-assigning data into the process scanner. The process scanner generates tint pattern data expressing the colors in respective pattern areas of the line drawing and produces halftone positives or halftone negatives of the tint patterns as a function of the tint pattern data.

However, if the tint pattern data are generated so as to express the colors only at the inside of the outlines, the printed matter to be produced on the basis of the tint pattern data includes blank lines, that is, white lines on which no ink is printed in place of the outlines.

In order to prevent the occurrence of blank lines, the tint patterns may be expanded to cover the areas on which the outlines are positioned. However, it is not easy in general to expand the tint patterns by modifying the tint pattern data in the process scanner as well as modifying the tint patterns manually because respective widths of the outlines are not constant in the line drawing. In other words, when the tint pattern data are modified to expand the tint patterns by a constant width all around under the condition that the constant widths is smaller than the largest width of the outlines, some blank lines appear at some areas on the printed matter where parts of the outlines of larger width than the constant width are positioned. On the other hand, if the constant width is larger than the smallest width of the outlines, two different color inks of the neighboring pattern areas are overlapped on those areas where parts of the outlines of smaller width than the constant width are positioned.

SUMMARY OF THE INVENTION

The present invention is directed to a method of and an apparatus for generating tint pattern data used for producing tint patterns by which a color print is reproduced, the method comprising the steps of: (a) preparing a first image data expressing a first image including a line having finite width, a first area and a second area, where the first and second areas are separated from each other by the line, (b) executing a thinning process on the first image data in order to reduce the width of the line to form a thinned line having a uniform width, thereby to obtain a second image data expressing a second image including the thinned line, an enlarged first area and an enlarged second area, where the enlarged first and second areas are separated from each other by the thinned line, (c) generating third and fourth image data depicting the shapes of the enlarged first and second areas, respectively, (d) executing an expansion process on the third and fourth image data in order to expand the enlarged first and second areas by a constant width to form first and second expanded areas, respectively, (e) generating fifth and sixth image data expressing shapes of the first and second tint areas, respectively, and (f) generating tint pattern data, which expresses the shapes of the first and second expanded areas with respective prescribed colors, as a function of the fifth and sixth image data.

According to one aspect of the present invention, the first through sixth image data are formed as binary data assigned to each pixel, and the thinning process and the expansion process are performed through first and second logical processing operations respectively, where a pixel cluster consisting of a plurality of pixels is previously defined, respective binary data for the plurality of the pixels are subjected to the first and second logical processings, and binary data of a central portion of the pixel cluster is replaced by respective results of said first and second logical processings in the pixel cluster, respectively.

According to another aspect of the present invention, the thinning process is performed under the conditions of: (1) a first condition that the line is not divided into pieces by the thinning process, (2) a second condition that the thinned line is formed at the central portion of the line, (3) a third condition that the length of the thinned line is kept the same as that of the line even if the line is formed as a segment, and (4) a fourth condition that two arbitrary pixels neighboring each other are regarded as being continuous.

Preferably, a value of the third and fourth image data may be a first logical value at the inside of the enlarged first and second areas, respectively, and a second logical value at the outside of the enlarged first and second areas, respectively, and the second logical processing includes a logical summation amoung binary data of all pixels included in the pixel cluster.

Further, the constant width may be at least half of the uniform width. The constant width is preferably equal to the uniform width, and may be the same as the width of the pixel.

Accordingly, an object of the present invention is to provide a method of and an apparatus for generating tint pattern data which are useful in producing tint patterns in contact with each other on printed matter. Another object of the present invention is to prevent blank lines and overprinted areas from being produced on the printed matter.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
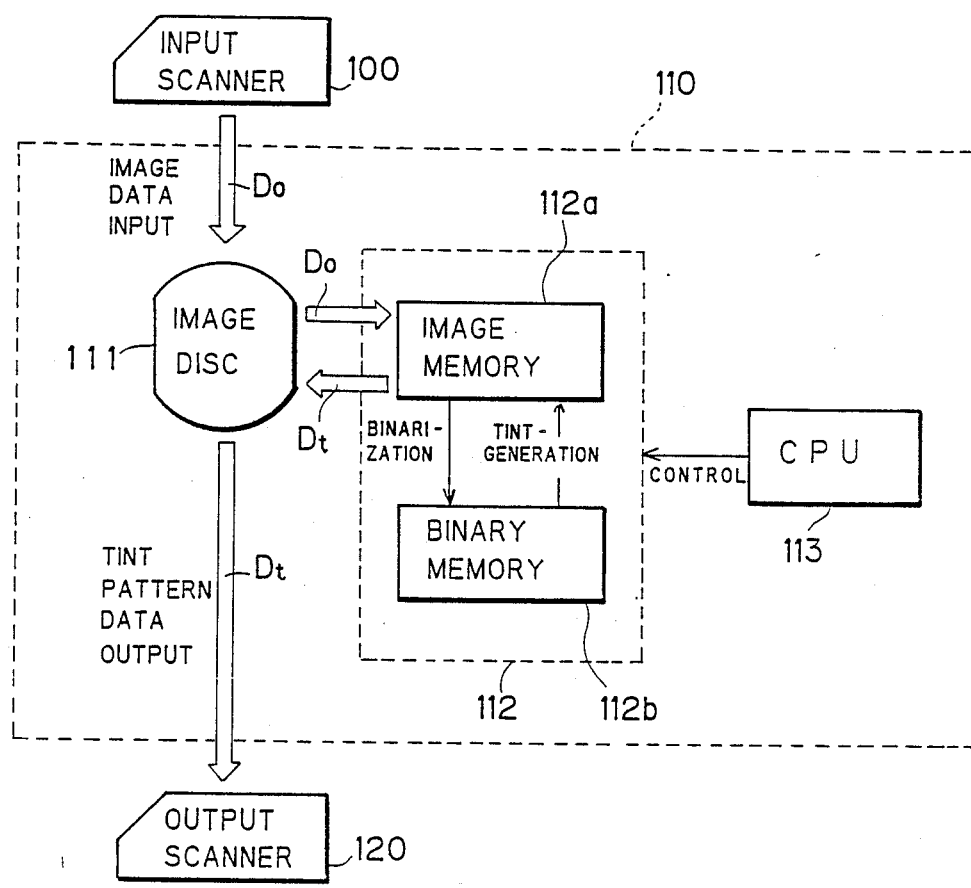
FIG. 1 is a block diagram showing the structure of an image processing apparatus.

FIG. 1 is a block diagram showing the structure of an image processing apparatus that represents a preferred embodiment of the present invention. The image processing apparatus 110 comprises an image disc 111, a processing part 112 and a CPU 113. The image processing apparatus 110 first receives signals indicative of original image data $D_o$ of a line drawing from an input scanner 100. A variety of devices such as a process scanner, a computer and the like, which generates the original image data $D_o$, can be employed in place of the input scanner 100. The original image data $D_o$, which expresses shapes and densities of outlines in the line drawing, is stored in the image disc 111. The original image data $D_o$ is then transmitted from the image disc 111 to the processing part 112 to be subjected to data processing such as a thinning process on outline areas and processing for generating tint pattern data $D_t$ expressing tints to be laid on respective tint pattern areas. The tint pattern data $D_t$ is transmitted from the processing part 112 to the image disc 11 to be stored therein. The tint pattern data $D_t$ is then outputted from the image disc 111 to an output scanner 120, by means of which tint patterns are recorded as halftone positives or halftone negatives.

The processing part 112 comprises an image memory 112a and a binary memory 112b. The image memory 112a temporarily stores a part of the original image data $D_o$ to be processed in the processing part 112 and the binary memory 112b also temporarily stores binary data obtained through binarization of the original image data $D_o$. The data processing in the processing part 112 is performed under the control of command signals delivered from the CPU 113.

Figure 2A:
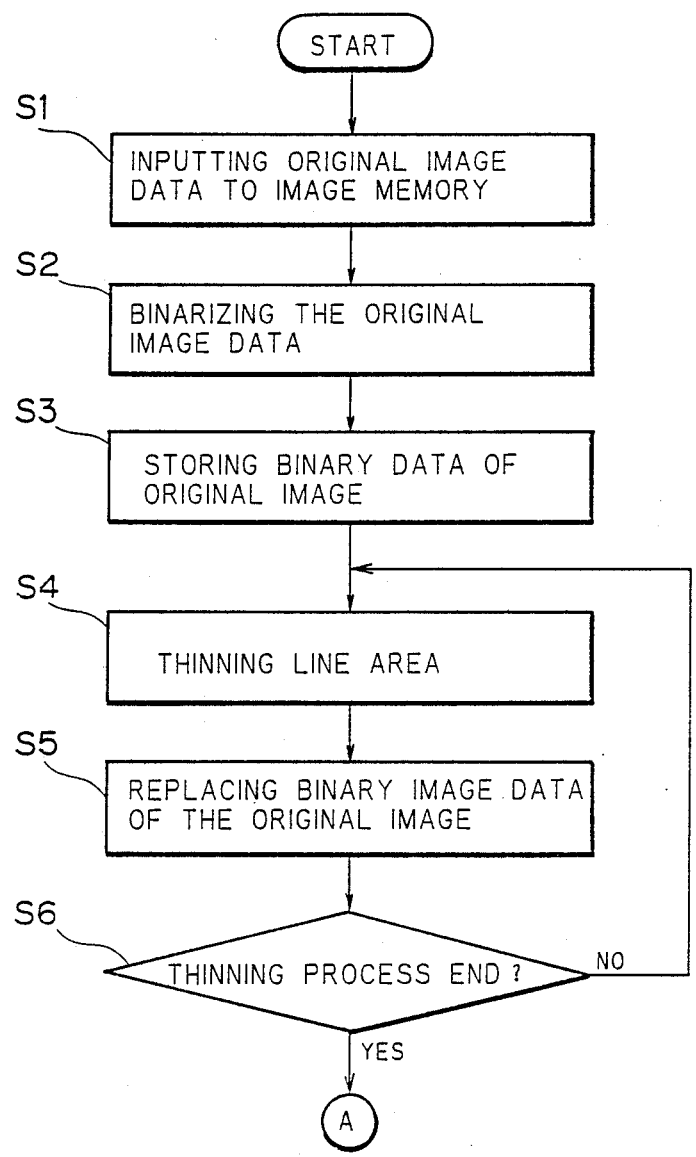
FIG. 2 is a flow chart showing the procedure according to a preferred embodiment of the present invention.
Figure 2B:
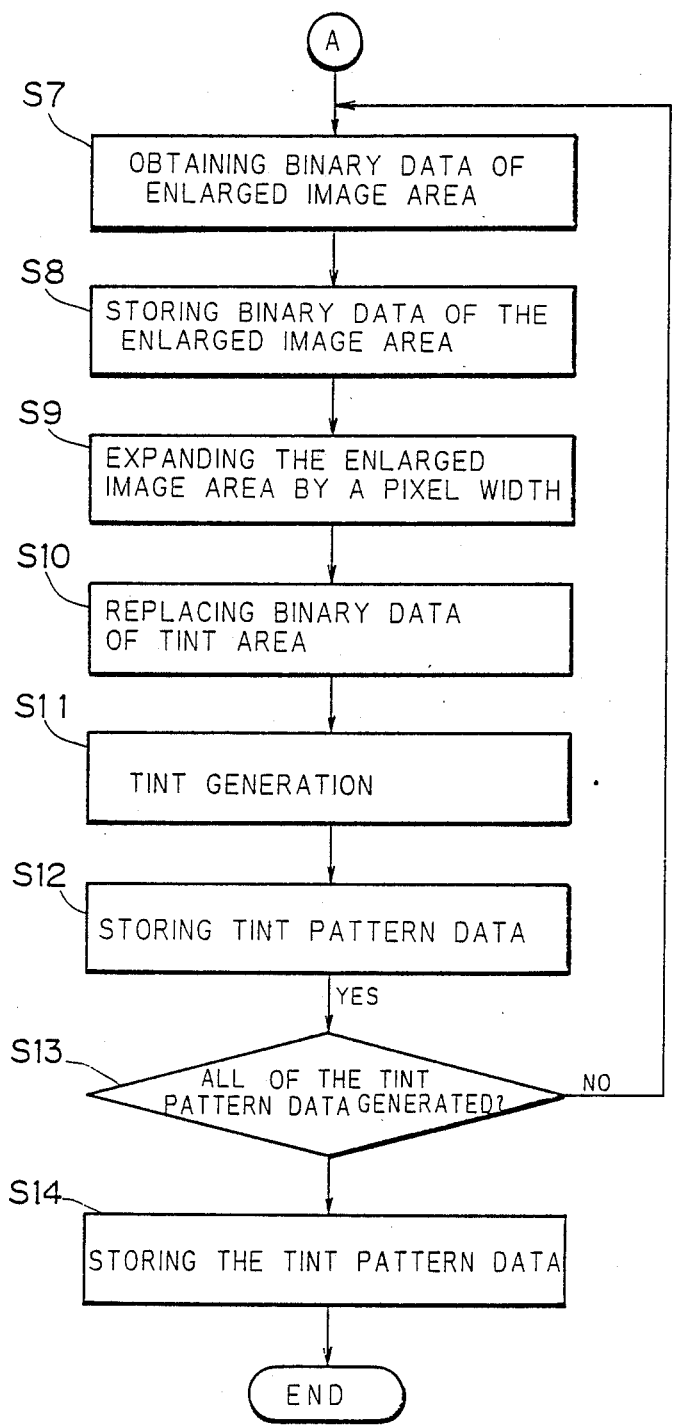

FIG. 2 is a flow chart showing the operating procedure of the preferred embodiment of the present invention. FIGS. 3A-3F is a diagram showing the images at the main steps of the preferred embodiment.

Figure 3A:
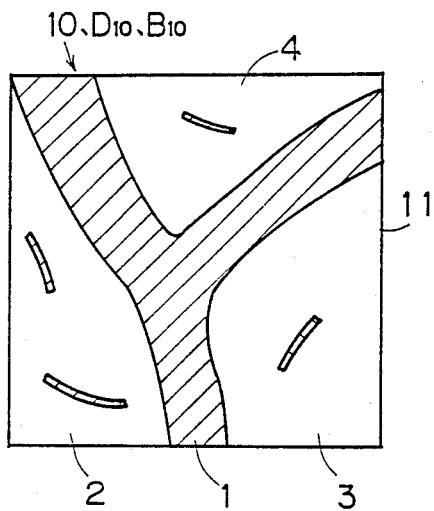
FIGS. 3A-3F is a schematic view of images according to the preferred embodiment.

First, original image data $D_{10}$ for an original image 10 shown in FIG. 3A is outputted from the image disc 111 into the image memory 112a at a step S1. The original image 10 has a shape of ten millimeter square, for example, and it is a part of a whole original image expressed by the original image data $D_o$. There are three image areas 2, 3 and 4 separated from each other by a line area 1 in the original image 10. The original image data $D_{10}$ expresses the shape and the optical density of the line area 1. The original image 10 shown in FIG. 3A is an enlarged part of the whole original image and the line area 1 is consequently a part of outlines drawn on the whole original image. Some colors may be already assigned to the image areas 2, 3 and 4, or alternatively, they are not assigned yet. Namely, the original image may be either of a color picture or a line drawing of black and white. The original image data $D_{10}$ is the density data assigned to each pixel, for example.

The original image data $D_{10}$ is binarized by the CPU 113 at a step S2 based upon a prescribed threshold value. That is, if the density value of a pixel is higher than the threshold value, the binary data for the pixel is set at "1", and if the density value is lower than the threshold value, the binary data for the pixel is set at "0". If the image areas 2, 3 and 4 already have their respective assigned colors, the threshold value is set at a density higher than the respective colors and lower than that of the line area 1. Such a selection of the threshold value is possible since the line area 10 has been drawn with black or another deep color whose optical density is higher than that of the respective colors assigned to the areas 2, 3 and 4. The binary data $B_{10}$ for the original image 10 thus obtained expresses the shape of the line area 1. If the original image data $D_{10}$ itself is given as the binary data $B_{10}$ and is transmitted from the image disc 111 to the image memory 112a at the step S1, it is not necessary to execute the step S2.

The binary data $B_{10}$ thus obtained is stored in both the binary memory 112b and the image disc 111 at the step S3.

The binary data $B_{10}$ is subjected to a thinning process for reducing the width of the line area 1 by a pixel width at a step S4. The thinning process will be described in detail later. As a result, at the step S4 there is obtained from the line area 1 a reduced binary data, which expresses the shape of a reduced line area reduced by the pixel width.

At a step S5, the binary data $B_{10}$ stored in the binary memory 112b is replaced by the reduced bianry data obtained at the step S4.

Figure 3B:
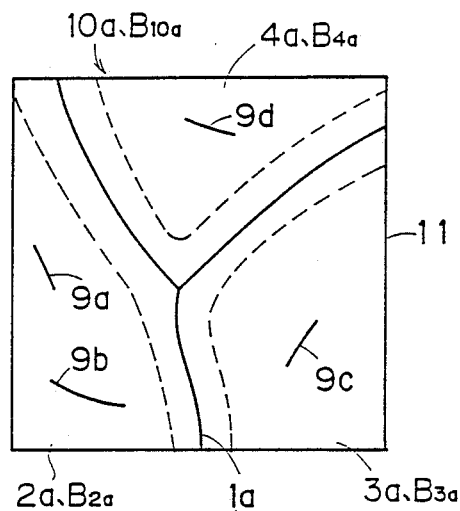

The shape of the line area after the thinning process is compared with that before the thinning process at a step S6. If the shape of the line area is changed, the steps S4 through S6 are excuted again. On the other hand, if the shape of the line area is found to be unchanged, the thinning process is ended. Consequently, binary data $B_{10a}$ expressing an image 10a shown in FIG. 3B is obtained after repeating the steps S4-S6. The image 10a includes a thinned line area 1a whose width is equal to the pixel width, and enlarged image areas 2a, 3a and 4a which are expanded from the image areas 2, 3 and 4 shown in FIG. 3A.

Figure 4:
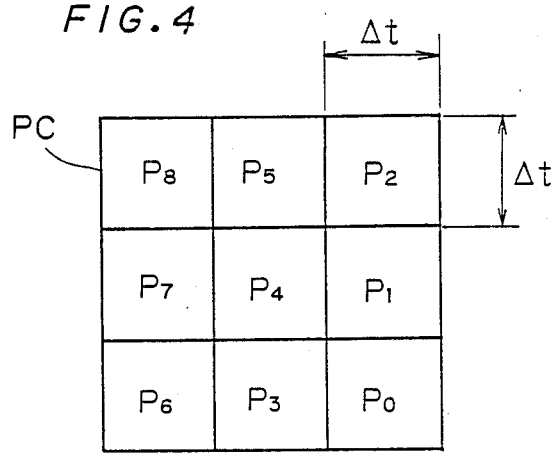
FIG. 4 is a schematic view showing a pixel cluster.

The thinning process at the step S4 is performed with a (3×3) pixel cluster PC having nine pixels $P_0$ through $P_8$ as shown in FIG. 4. The center pixel $P_4$ is sequentially positioned at each pixel in the original image 10, while performing logical processing on nine binary data assigned to the pixels $P_0$ through $P_8$ in the binary data $B_{10}$ of the original image 10. Through the logical processing, the line area 1 is cut down by the pixel width $\Delta t$ at one side thereof. As a result, the width of the line area 1 is reduced by the pixel width $\Delta t$ after one thinning process at the step S4. The thinning process is repeated in order to reduce the line area 1 to the thinned line area 1a having a width equal to the pixel width $\Delta t$.

Preferably, the content of the logical processing is determined by consideration of the following conditions:

C1: A line area is not divided into pieces by the logical processing.

C2: A thinned line area is formed at the central portion of an initial line area C3: Even if an initial line area in an original image does not form a closed loop, that is, even if the initial line area is formed as a segment, the length of a thinned line area is kept the same as that of the initial line area.

However, the line area 1 shown in FIG. 3A, which ends at a frame 11 of the original image 10, is treated as a closed loop. Under this condition, segments 9a–9d of the pixel width Δt remains as a noise component in the image 10a after the thinning process. However, the segments 9a–9d are eliminated at a step S9 which will be described later.

C4: Two pixels neighboring each other at either of the vertical direction, the lateral direction and the oblique direction are treated as being continuous in order not to cut a line area.

C5: The logical processing is performed only on the basis of the binary data of the nine pixels $P_0$ through $P_8$ in the pixel cluster PC.

The logical processing satisfying the conditions C1 through C5 can be performed through the following equations:

$$a_4 \text{(new)} = N_1 + N_2 + N_3 + N_4 + N_5 + N_6 + N_7 + N_8 + N_9 + N_{10} + N_{11} + N_{12} + N_{13} + N_{14} + N_{15} + N_{16} + N_{17} + N_{18} + N_{19} + N_{20} \tag{1}$$

$$N_1 = a_1 \times \text{INV}(a_3) \times a_4 \times \text{INV}(a_5) \times a_7 \tag{2a}$$

$$N_2 = \text{INV}(a_1) \times a_3 \times a_4 \times a_5 \times \text{INV}(a_7) \tag{2b}$$

$$N_3 = a_1 \times \text{INV}(a_2) \times \text{INV}(a_3) \times a_4 \times a_5 \tag{2c}$$

$$N_4 = a_4 \times a_5 \times a_7 \times \text{INV}(a_8) \times \{\text{INV}(a_1) + \text{INV}(a_3)\} \tag{2d}$$

$$N_5 = \text{INV}(a_1) \times a_3 \times a_4 \times \text{INV}(a_6) \times a_7 \tag{2e}$$

$$N_6 = \text{INV}(a_3) \times a_4 \times a_6 \times \text{INV}(a_7) \times (a_0 + a_1 + a_2 + a_5 + a_8) \tag{2f}$$

$$N_7 = a_0 \times \text{INV}(a_1) \times \text{INV}(a_3) \times a_4 \times (a_2 + a_5 + a_6 + a_7 + a_8) \tag{2g}$$

$$N_8 = \text{INV}(a_1) \times a_2 \times a_4 \times \text{INV}(a_5) \times (a_0 + a_3 + a_6 + a_7 + a_8) \tag{2h}$$

$$N_9 = \text{INV}(a_3) \times a_4 \times \text{INV}(a_5) \times \text{INV}(a_7) \times a_8 \times (a_0 + a_1 + a_2 + a_6) \tag{2i}$$

$$N_{10} = \text{INV}(a_1) \times a_4 \times \text{INV}(a_5) \times \text{INV}(a_7) \times a_8 \times (a_0 + a_2 + a_3 + a_6) \tag{2j}$$

$$N_{11} = a_1 \times a_3 \times a_4 \times a_5 \times a_7 \tag{2k}$$

$$N_{12} = a_1 \times a_3 \times a_4 \tag{2l}$$

$$N_{13} = a_0 \times \text{INV}(a_1) \times \text{INV}(a_2) \times \text{INV}(a_3) \times a_4 \times \text{INV}(a_5) \times \text{INV}(a_6) \times \text{INV}(a_7) \times \text{INV}(a_8) \tag{2m}$$

$$N_{14} = \text{INV}(a_0) \times a_1 \times \text{INV}(a_2) \times \text{INV}(a_3) \times a_4 \times \text{INV}(a_5) \times \text{INV}(a_6) \times \text{INV}(a_7) \times \text{INV}(a_8) \tag{2n}$$

$$N_{15} = \text{INV}(a_0) \times \text{INV}(a_1) \times a_2 \times \text{INV}(a_3) \times a_4 \times \text{INV}(a_5) \times \text{INV}(a_6) \times \text{INV}(a_7) \times \text{INV}(a_8) \tag{2o}$$

$$N_{16} = \text{INV}(a_0) \times \text{INV}(a_1) \times \text{INV}(a_2) \times a_3 \times a_4 \times \text{INV}(a_5) \times \text{INV}(a_6) \times \text{INV}(a_7) \times \text{INV}(a_8) \tag{2p}$$

$$N_{17} = \text{INV}(a_0) \times \text{INV}(a_1) \times \text{INV}(a_2) \times \text{INV}(a_3) \times a_4 \times a_5 \times \text{INV}(a_6) \times \text{INV}(a_7) \times \text{INV}(a_8) \tag{2q}$$

$$N_{18} = \text{INV}(a_0) \times \text{INV}(a_1) \times \text{INV}(a_2) \times \text{INV}(a_3) \times a_4 \times \text{INV}(a_5) \times a_6 \times \text{INV}(a_7) \times \text{INV}(a_8) \tag{2r}$$

$$N_{19} = \text{INV}(a_0) \times \text{INV}(a_1) \times \text{INV}(a_2) \times \text{INV}(a_3) \times a_4 \times \text{INV}(a_5) \times \text{INV}(a_6) \times a_7 \times \text{INV}(a_8) \tag{2s}$$

$$N_{20} = \text{INV}(a_0) \times \text{INV}(a_1) \times \text{INV}(a_2) \times \text{INV}(a_3) \times a_4 \times \text{INV}(a_5) \times \text{INV}(a_6) \times \text{INV}(a_7) \times a_8 \tag{2t}$$

$$a_4 \text{(new)} = M_1 + M_2 + M_3 + M_4 + M_5 + M_6 + M_7 + M_8 + M_9 + M_{10} + M_{11} + M_{12} + M_{13} + M_{14} + M_{15} + M_{16} + M_{17} + M_{18} + M_{19} + M_{20} \tag{3}$$

$$M_1 = a_1 \times \text{INV}(a_3) \times a_4 \times \text{INV}(a_5) \times a_7 \tag{4a}$$

$$M_2 = \text{INV}(a_1) \times a_3 \times a_4 \times a_5 \times \text{INV}(a_7) \tag{4b}$$

$$M_3 = a_3 \times a_4 \times \text{INV}(a_5) \times \text{INV}(a_6) \times a_7 \tag{4c}$$

$$M_4 = \text{INV}(a_0) \times a_1 \times a_3 \times a_4 \times \{\text{INV}(a_5) + \text{INV}(a_7)\} \tag{4d}$$

$$M_5 = a_1 \times \text{INV}(a_2) \times a_4 \times a_5 \times \text{INV}(a_7) \tag{4e}$$

$$M_6 = \text{INV}(a_3) \times a_4 \times a_6 \times \text{INV}(a_7) \times (a_0 + a_1 + a_2 + a_5 + a_8) \tag{4f}$$

$$M_7 = a_0 \times \text{INV}(a_1) \times \text{INV}(a_3) \times a_4 \times \text{INV}(a_5) \times (a_2 + a_6 + a_7 + a_8) \tag{4g}$$

$$M_8 = a_0 \times \text{INV}(a_1) \times \text{INV}(a_3) \times a_4 \times \text{INV}(a_7) \times (a_2 + a_5 + a_6 + a_8) \tag{4h}$$

$$M_9 = \text{INV}(a_1) \times a_2 \times a_4 \times \text{INV}(a_5) \times (a_0 + a_3 + a_6 + a_7 + a_8) \tag{4i}$$

$$M_{10} = a_4 \times \text{INV}(a_5) \times \text{INV}(a_7) \times a_8 \times (a_0 + a_1 + a_2 + a_3 + a_6) \tag{4j}$$

$$M_{11} = a_1 \times a_3 \times a_4 \times a_5 \times a_7 \tag{4k}$$

$$M_{12} = a_4 \times a_5 \times a_7 \tag{4l}$$

$$M_{13} = a_0 \times \text{INV}(a_1) \times \text{INV}(a_2) \times \text{INV}(a_3) \times a_4 \times \text{INV}(a_5) \times \text{INV}(a_6) \times \text{INV}(a_7) \times \text{INV}(a_8) \tag{4m}$$

$$M_{14} = \text{INV}(a_0) \times a_1 \times \text{INV}(a_2) \times \text{INV}(a_3) \times a_4 \times \text{INV}(a_5) \times \text{INV}(a_6) \times \text{INV}(a_7) \times \text{INV}(a_8) \tag{4n}$$

$$M_{15} = \text{INV}(a_0) \times \text{INV}(a_1) \times a_2 \times \text{INV}(a_3) \times a_4 \times \text{INV}(a_5) \times \text{INV}(a_6) \times \text{INV}(a_7) \times \text{INV}(a_8) \tag{4o}$$

$$M_{16} = \text{INV}(a_0) \times \text{INV}(a_1) \times \text{INV}(a_2) \times a_3 \times a_4 \times \text{INV}(a_5) \times \text{INV}(a_6) \times \text{INV}(a_7) \times \text{INV}(a_8) \tag{4p}$$

$$M_{17} = \text{INV}(a_0) \times \text{INV}(a_1) \times \text{INV}(a_2) \times \text{INV}(a_3) \times a_4 \times a_5 \times \text{INV}(a_6) \times \text{INV}(a_7) \times \text{INV}(a_8) \tag{4q}$$

$$M_{18} = \text{INV}(a_0) \times \text{INV}(a_1) \times \text{INV}(a_2) \times \text{INV}(a_3) \times a_4 \times \text{INV}(a_5) \times a_6 \times \text{INV}(a_7) \times \text{INV}(a_8) \tag{4r}$$

$$M_{19} = \text{INV}(a_0) \times \text{INV}(a_1) \times \text{INV}(a_2) \times \text{INV}(a_3) \times a_4 \times \text{INV}(a_5) \times \text{INV}(a_6) \times a_7 \times \text{INV}(a_8) \tag{4s}$$

$$M_{20} = \text{INV}(a_0) \times \text{INV}(a_1) \times \text{INV}(a_2) \times \text{INV}(a_3) \times a_4 \times \text{INV}(a_5) \times \text{INV}(a_6) \times \text{INV}(a_7) \times a_8 \tag{4t}$$

where
$a_4$ (new): new binary data of the pixel $P_4$
$a_0 - a_8$: initial binary data of the pixels $P_0 - P_8$
$\times$: AND operation
$+$: OR operation
INV($a_i$): inverted data of the binary data $a_i$ The respective right hand sides of the equations (1) and (3) are alternately calculated while replacing the value of the binary data $a_4$ in the right hand side by that obtained in the preceeding calculation as the data $a_4$ (new).

Figure 5A:
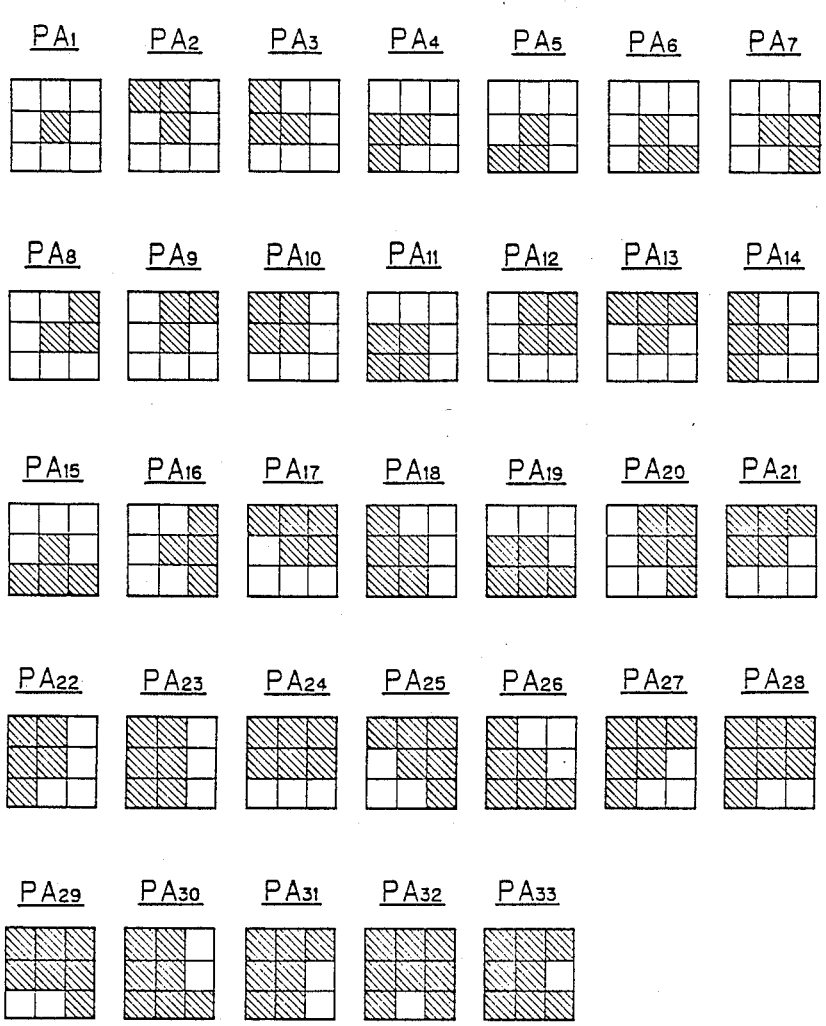
FIGS. 5A-5B is a schematic view showing patterns of binary data in the pixel cluster in a thinning process.
Figure 5B:
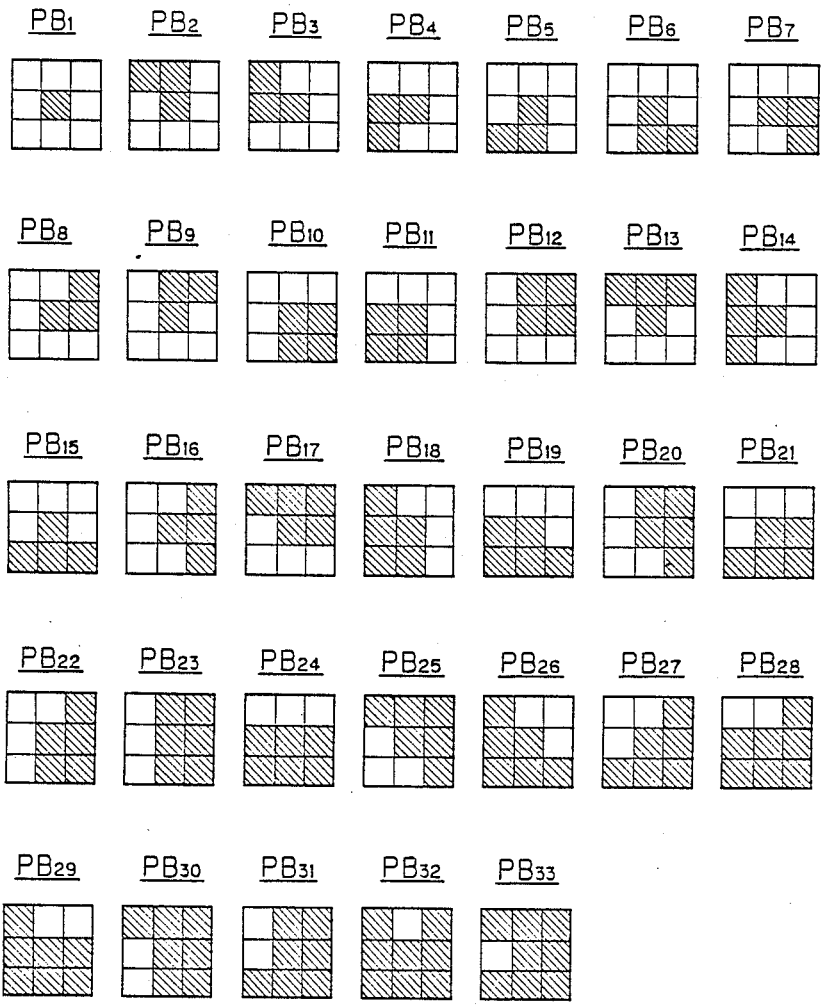

FIG. 5 is a schematic view showing patterns $PA_1$–$PA_{33}$ and $PB_1$–$PB_{33}$ of binary data in the pixel cluster PC, at which patterns the binary data $a_4$ of the center pixel $P_4$ is changed from "1" to "0" by the equations (1) and (3), respectively. Shaded pixels in the patterns $PA_1$–$PA_{33}$ and $PB_1$–$PB_{33}$ show that the initial binary data at the pixels are "1", and non-shaded pixels show that initial binary data at those pixels are "0". The shaded area is a part of the line area 1. The patterns $PA_1$ through $PA_{33}$ shown in FIG. 5A corresponds to the equation (1) and the patterns $PB_1$ through $PB_{33}$ shown in FIG. 5B corresponds to the equation (3). As can be seen from the patterns $PA_1$ through $PA_{33}$, especially the patterns $PA_{21}$ through $PA_{33}$, the equation (1) operates to eliminate the lower and right sides of the line area 1. On the other hand, as can be seen from the patterns $PB_{21}$ through $PB_{33}$, the equation (3) operates to eliminate the upper and left sides of the line area 1. With respect to patterns other than those shown in FIG. 5, the binary data $a_4$ of the center pixel $P_4$ is not changed by the equations (1) nor (3).

During the repetition of the steps S4 through S6, a first logical processing in accordance with the equation (1) is first performed at the step S4, thereby to obtain a reduced binary data expressing a shape of a once-reduced line area whose width is reduced by the pixel width $\Delta t$ at the lower and right sides of the line area 1. After returning to the step S4 through the steps S5 and S6, a second logical processing in accordance with the equation (3) is performed, thereby to obtain a twice-reduced binary data expressing the shape of a twice-reduced line area whose width is reduced by the pixel width $\Delta t$ at the upper and left sides of the once-reduced line area. Namely, the first logical processing operation the equation (1) and the second logical processing operation using the equation (3) are alternately performed at the step S4 until the thinned line area 1a having the pixel width $\Delta t$ is finally obtained.

Figure 6A:
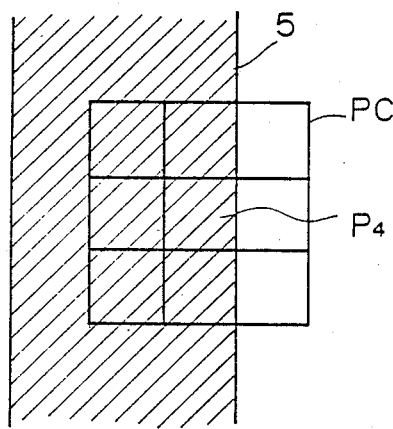
FIG. 6 is a schematic view showing the thinning process using the pixel cluster.
Figure 6B:
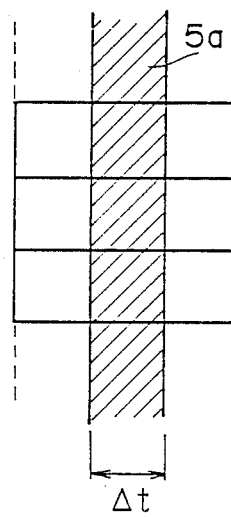

FIG. 6 is a view schematically showing the logical processing. If the pixel cluster PC is so positioned that the center pixel $P_4$ is located at the edge of an initial line area 5 as shown in FIG. 6A, the result of the first logical operation using the equation (1) becomes "0", whereby the binary data $a_4$ of the center pixel $P_4$ is replaced by the value of "0". After the first logical processing with the equation (1) for all the pixels included in the image, the right side of the line area 5 is eliminated. Then, the second logical processing with the equation (3) is performed. As a result, a thinned line area 5a of the pixel width $\Delta t$ is obtained as shown in FIG. 6B. However, at this time segments 9a–9d remain in the enlarged image areas 2a, 3a and 4a shown in FIG. 3B because of the condition C3 described before.

Figure 3C:
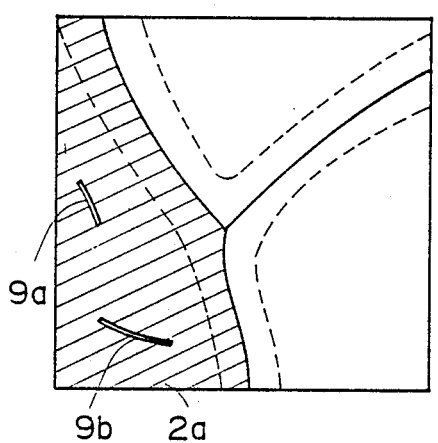

At a step S7, binary data $B_{2a}$ expressing the shape of the enlarged image area 2a is obtained. In this step, the image 10a shown in FIG. 3B is first displayed on an image display means such as a cathode ray tube (CRT), then an operator designates one of the enlarged image areas 2a, 3a and 4a as a subject area with a stylus pen, a mouse or the like by pointing out some position in the enlarged image area 2a and specifies a color density of the designated image area 2a by inputting color density data with a keyboard or the like. The processing part 112 recognizes that pixels having a value of "0" in the enlarged area included in the position pointed out by the operator and enclosed by the thinned line area 1a and the frame 11, are included in a single area. As a result, the binary data $B_{2a}$ expressing the shape of the enlarged image area 2a shown in FIG. 3C is obtained. Namely, binary data of pixels included in the enlarged image area 2a are set at "1", and binary data of pixels out of the enlarged image area 2a in the image 10a are set at "0". However, binary data at the segments 9a and 9b, which remain in the enlarged image area 2a as noise components and have values of "1" in the binary data $B_{10a}$ at the step S4, are set at "0" in the binary data $B_{2a}$ as noise component. The segments 9a and 9b are shown as non-shaded areas in FIG. 3c.

The binary data $B_{2a}$ is stored in the binary memory 112b at a step S8.

At a step S9, logical processing is performed on the binary data $B_{2a}$ for expanding the enlarged image area 2a by the pixel width $\Delta t$ toward the thinned line area 1a. The logical processing is an OR operation as follows:

$$a_4 \text{ (new)} = a_0 + a_1 + a_2 + a_3 + a_4 + a_5 + a_6 + a_7 + a_8 \tag{5}$$

Figure 3D:
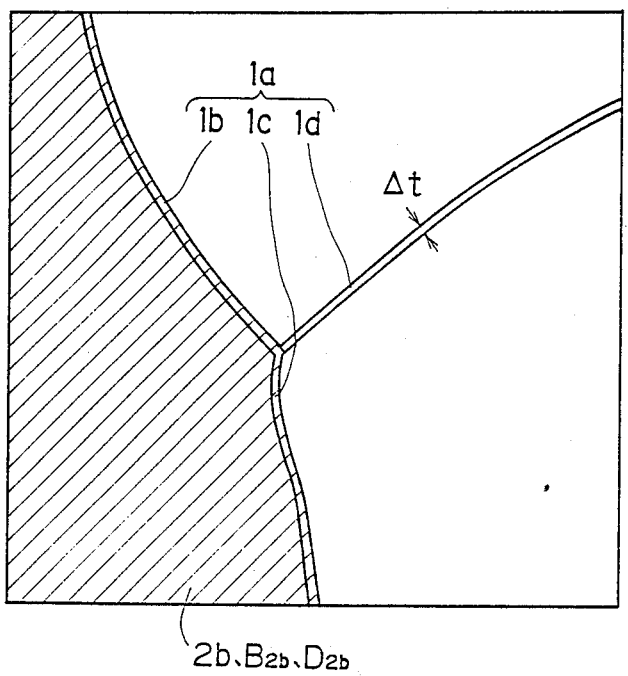

According to the OR operation, binary data of "0" at pixels neighboring a pixel having a binary data of "1" are changed to be "1". As a result, the enlarged image area 2a is expanded by the pixel width $\Delta t$, thereby to become a tint area 2b including two parts 1b and 1c of the thinned line area 1a. FIG. 3D is an enlarged view showing the tint area 2b obtained through the expansion operation in the step S9. Furthermore, the expansion operation by the equation (5) functions so as to eliminate the segments 9a and 9b which remained in the enlarged image area 2a as noise components because the segments 9a and 9b are of the pixel width $\Delta t$ and are expressed with values of "0" in the binary data $B_{2a}$. As a result, binary data $B_{2b}$ expressing the shape of the tint area 2b without the noise component is obtained at the step S9.

The binary data $B_{2a}$ stored in the binary memory 112b is replaced by the binary data $B_{2b}$ for the tint area 2b at the step S10.

Then, tint-generation processing is performed on the binary data $B_{2b}$ at a step S11. Namely, tint pattern data $D_{2b}$, which expresses the shape and color of the tint area 2b, is generated on the basis of the binary data $B_{2b}$ and a color density previously specified by an operator for the tint area 2b.

The tint pattern data $D_{2b}$ thus obtained is stored in the image memory 112a at the step S12.

Figure 3E:
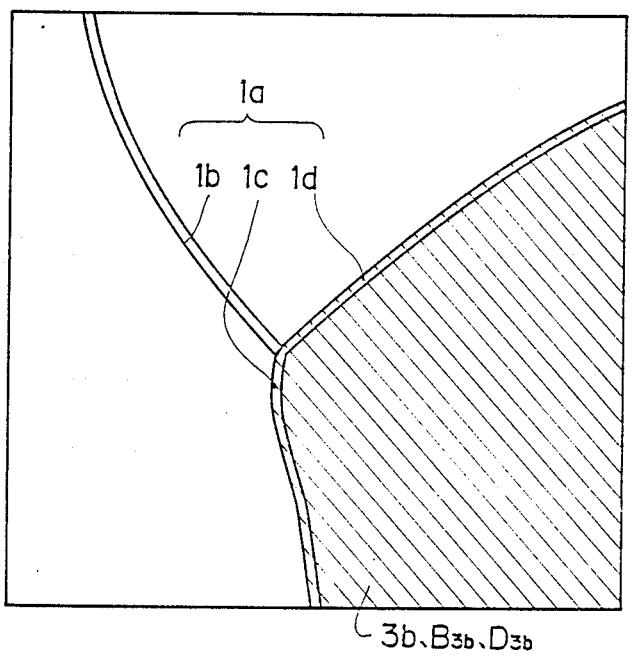

If it is determined at the step S13 that all of the tint pattern data has not yet been generated, then the tint pattern data $D_{3b}$ for a tint area 3b shown in FIG. 3E is obtained by repeating the steps S7 through S12 after returning to the step S7 from the step S13. The tint area 3b is an area expanded by a pixel width $\Delta t$ toward the thinned line area 1a from the enlarged image area 3a in the same way as that for the tint area 2b. The tint area 3b covers two parts 1c and 1d of the thinned line area 1a similar to the way tint area 2b included the parts 1b and 1c. A part of the tint pattern data $D_{2b}$, which corresponds to the part 1c of the thinned line area 1a included in both the tint areas 2b and 3b, is scratched and that part 1c is expressed by the tint pattern data $D_{3b}$ which is generated later than the tint pattern data $D_{2b}$. The steps S7 through S13 are repeated in order to generate all of the tint pattern data $D_{2b}$, $D_{3b}$ and $D_{4b}$ concerning the image areas 2, 3 and 4, which includes all of the image area in the original image 10 stored in the image memory 112a.

Figure 3F:
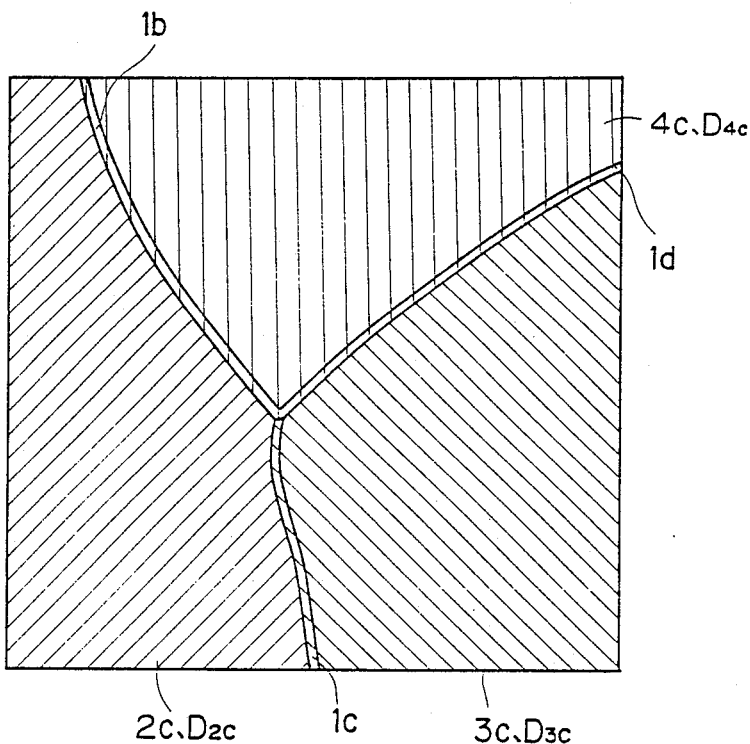

FIG. 3F is a diagram schematically showing the final tint areas 2c, 3c and 4c expressed by the final tint pattern data $D_{2c}$, $D_{3c}$ and $D_{4c}$, respectively, which are finally obtained after the repetition of the steps S7 through S13. The final tint areas 2c, 3c and 4c are formed so as to contact each other and not to cause an overlap nor a blank between them. The final tint area 2c is the same as the enlarged image area 2a because the two parts 1c and 1b of the thinned line area 1a included in the tint area 2b shown in FIG. 3D are expressed by the final pattern data $D_{3c}$ and $D_{4c}$, respectively. The part 1c of the thinned line area 1a, which is positioned between the enlarged image area 2a and 3a is expressed by the final tint pattern data $D_{3c}$ and the other part 1b of the thinned line area 1a is expressed by the final tint pattern data $D_{4c}$. As will be understood by those skilled in the art, the final tint pattern data $D_{4c}$ is the same as the tint pattern data $D_{4b}$ which is generated at the latest of all the tint pattern data $D_{2b}$, $D_{2c}$ and $D_{4b}$.

The final tint pattern data $D_{2c}$, $D_{3c}$ and $D_{4c}$ thus obtained are transmitted to the image disc 111 and stored therein at a step S14.

The steps S1 through S14 are sequentially repeated for the other parts of the whole original image, whereby final tint pattern data concerning all of the image areas included in the whole original image are generated.

In the above described procedure, the line area 1 is reduced to the thinned line area 1a having the width $\Delta t$ of one pixel. However, the line area 1 may be reduced to have a uniform width of $N\Delta t$, where N is an integer, by the end of the step S6. When the steps S7 through S13 are executed in this case, final tint areas are also formed so as to contact each other and not to cause an overlap nor a blank between them if the amount of expansion at the step S9 is set at $N\Delta t$. The amount of expansion may be set at a value of at least half of $N\Delta t$ in order for final tint areas to contact each other and not to cause an overlap nor a blank between them. However, if the line area 1 is reduced to have the width $\Delta t$ of one pixel, as is described in the above embodiment, respective differences between the enlarged image areas 2a, 3a and 4a and the tint areas 2c, 3c and 4c can be minimized.

In an actual printing process, printing blocks for the tint areas 2c, 3c and 4c are produced on the basis of the final tint pattern data $D_{2c}$, $D_{3c}$ and $D_{4c}$, and a multicolor print with no line area of black color nor blank line is reproduced with the blocks. A multicolor print having the line area 1 of black color can also be reproduced through overprinting the line area 1, if necessary.

According to the present invention, image areas separated from each other by a line whose width is not constant can be easily transformed into tint areas contacting each other without causing an overlap nor a blank between them, and tint pattern data expressing respective shapes of the tint areas with prescribed colors can be easily generated.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A method of generating tint pattern data used for producing tint patterns by which a color print of an image is reproduced, said method comprising the steps of:
   (a) preparing first image data dpicting a first image including a first area, a second area and a line having finite width separating said first and second areas,
   (b) executing a thinning process on said first image data in order to reduce the width of said line to form a thinned line having a uniform width, thereby to obtain second image data representing a second image including said thinned line, an enlarged first area and an enlarged second area, where said enlarged first and second areas are separated from each other by said thinned line,
   (c) generating third and fourth image data depicting said enlarged first and second areas, respectively,
   (d) executing an expansion process on said third and fourth image data in order to expand said enlarged first and second areas by a constant width to form first and second expanded areas, respectively,
   (e) generating fifth and sixth image data depicting said first and second expanded areas, respectively, and
   (f) generating tint pattern data which represents said first and second expanded areas with respective prescribed colors as a function of said fifth and sixth image data.

2. A method in accordance with claim 1, wherein
said first through sixth image data are formed as binary data assigned to each pixel of the first image, and
said thinning process and said expansion process are performed by a first and second logical processing operation, respectively, where a pixel cluster including a plurality of pixels is previously defined, wherein respective binary data for said plurality of pixels are subjected to said first and second logical processing operations, and binary data of a central portion of said pixel cluster is replaced by respective results of said first and second logical processing operations in said pixel cluster, respectively.

3. A method in accordance with claim 2, wherein
said thinning process is performed under the following conditions:
   (1) a first condition that said line is not divided into pieces by said thinning process,
   (2) a second condition that said thinned line is formed at a central portion of said line,
   (3) a third condition that length of said thinned line is kept the same as that of said line even if said line is formed as a segment, and
   (4) a fourth condition that two arbitrary pixels neighboring each other are regarded as being continuous.

4. A method in accordance with claim 3, wherein
said third and fourth image data have a first logical value inside of said enlarged first and second areas, respectively, and a second logical value outside of said enlarged first and second areas, respectively, and
said second logical processing operation includes a logical summation of binary data of all pixels included in said pixel cluster.

5. A method in accordance with claim 4, wherein said constant width is at least half of said uniform width.

6. A method in accordance with claim 1, wherein said constant width is equal to said uniform width.

7. A method in accordance with claim 6, wherein each of said constant width and said uniform width is a width of said pixel.

8. An apparatus for generating tint pattern data used for producing tint patterns, by which a color print is reproduced as a function of of first image data signals depicting a first image including a first area, a second area, and a line having finite width separating said first and second areas, said apparatus comprising:

(a) means for executing a thinning process on said first image data signals in order to reduce the width of said line to form a thinned line having a uniform width, to thereby obtain second image data signals depicting a second image including an enlarged first area, an enlarged second area, and said thinned line separating said enlarged first and second areas, (b) means for generating third and fourth image data signals depicting shapes of said enlarged first and second areas, respectively, (c) means for executing an expansion process on said third and fourth image data signals in order to expand said enlarged first and second areas by a constant width to form first and second expanded areas, respectively, (d) means for generating fifth and sixth image data signals depicting shapes of said first and second expanded areas, respectively, and (e) means for generating tint pattern data which represents said shapes of said first and second expanded areas with respective prescribed colors as a function of said fifth and sixth image data signals.

9. An apparatus in accordance with claim 8, wherein said first through sixth image data signals are formed as binary data assigned to each pixel of an image, and said thinning process and said expansion process are performed by first and second logical processing operations, respectively, where a pixel cluster comprising a plurality of pixels is previously defined, respective binary data for said plurality of pixels being subjected to said first and second logical processing operations, and wherein binary data of a central portion of said pixel cluster is replaced by respective results of said first and second logical processing operations in said pixel cluster, respectively.

10. An apparatus in accordance with claim 9, wherein said thinning process is performed under the conditions of:

(1) a first condition that said line is not divided into pieces by said thinning process, (2) a second condition that said thinned line is formed at a central portion of said line, (3) a third condition that length of said thinned line is kept the same as that of said line even if said line is formed as a segment, and (4) a fourth condition that two arbitrary pixels neighboring each other are regarded as being continuous.

11. An apparatus in accordance with claim 10, wherein said third and fourth image data have a first logical value inside of said enlarged first and second areas, respectively, and a second logical value outside of said enlarged first and second areas, respectively, and said second logical processing operation includes a logical summation of binary data of all pixels included in said pixel cluster.

12. An apparatus in accordance with claim 11, wherein said constant width is at least half of said uniform width.

13. An apparatus in accordance with claim 11, wherein said constant width is equal to said uniform width.

14. An apparatus in accordance with claim 13, wherein each of said constant width and said uniform width is a width of said pixel.

15. In an image plane containing at least two image areas separated by a finite gap, a method of bringing said image areas closer together comprising:

(a) narrowing said gap down to a predetermined width while enlarging said image areas in size to thereby produce enlarged image areas, (b) selecting each of said enlarged image areas in sequence to specify a series of subject areas one by one, (c) expanding a first selected subject area in size by a constant width so that said first subject area penetrates into said gap, (d) expanding a second selected subject area in size by a constant width so that said second subject area penetrates into said gap whereby said gap is narrowed and said first and second subject areas are brought closer together.

16. A method as claimed in claim 15 wherein said first and second subject areas are expanded so as to contact each other such that said gap dissappears from said image plane.

17. Apparatus for generating tint pattern data for reproducing a color print of an original image, said apparatus comprising:

(a) means for storing first image data signals indicative of said original image including first and second areas separated by a line of finite width, (b) means for processing said image data signals so as to narrow the width of said line to form a thin line of a uniform width, (c) wherein said processing means includes means for sequentially expanding the size of said first and second areas by a constant width to form further signals depicting enlarged first and second areas separated by said thin line, and (d) means for generating tint pattern data signals which represent said enlarged first and second areas as a function of said further signals.

18. Apparatus as claimed in claim 17, wherein said constant width is at least one-half of said uniform width.

19. Apparatus as claimed in claim 17, wherein said processing means comprises:

(b-1) memory means for storing said further signals, (b-2) logic means for performing prescribed logic operations on said image signals and said further signals, and (b-3) a control unit for controlling said memory means and said logic means for controlling the processing and flow of data signals therebetween.

20. In an image plane containing two image areas and a finite gap area separating said image areas, a method of bringing said image areas closer together comprising:

(a) narrowing said gap down to a predetermined width without reference to said image areas, thereby to obtain a narrowed gap;

(b) enlarging each of said image areas without reference to said narrowed gap so as to contact said narrowed gap, thereby to obtain respective enlarged image areas;

(c) expanding at least one of said enlarged image areas in size so as to penetrate into said narrowed gap, whereby said gap area is narrowed and said image areas are brought closer together.

21. A method as claimed in claim 20, wherein at least one of said enlarged image areas are expanded so as to contact others on said narrowed gap such that said narrowed gap disappears from said image plane.

22. An apparatus for generating tint pattern data for reproducing a color print of an original image that includes two image areas and a finite line area separating said image areas, said apparatus comprising:
- (a) means for generating binarized image data for said image areas and binarized line data for said line area;
- (b) first memory means for storing said binarized line data;
- (c) second memory means for storing said binarized image data for one of said image areas;
- (d) first process means for processing said binarized line data so as to narrow the width of said line area, thereby to obtain thin line data of a narrowed line area in said first memory means;
- (e) second process means for processing said binarized image data stored in said second memory means to enlarge said one of said image areas so as to contact said narrowed line area in accordance with said thin line data, thereby to obtain enlarged image data of an enlarged image area in said second memory means;
- (f) third process means for processing said enlarged image data stored in said second memory means to expand said enlarged image area so as to penetrate into said narrowed line, thereby to generate expanded image data of an expanded image area; and
- (g) means for generating tint pattern data signals which represent said expanded image area as a function of said expanded image data.

* * * * *